United States Patent [19]
Levy

[11] Patent Number: 5,612,690
[45] Date of Patent: Mar. 18, 1997

[54] COMPACT KEYPAD SYSTEM AND METHOD

[76] Inventor: David Levy, 723 Raney Ct., Santa Clara, Calif. 95050-5533

[21] Appl. No.: 71,242

[22] Filed: Jun. 3, 1993

[51] Int. Cl.⁶ .................................................. H03K 17/94
[52] U.S. Cl. ........................ 341/22; 364/709.15; 400/485
[58] Field of Search ........................ 341/22, 34; 345/168, 345/173; 200/5 A; 400/485; 364/709.15; 340/543, 426, 430

[56] References Cited

U.S. PATENT DOCUMENTS

| | | | |
|---|---|---|---|
| 4,891,777 | 1/1990 | Lapeyre | 364/709.15 X |
| 4,912,462 | 3/1990 | Washizuka et al. | 345/173 |

OTHER PUBLICATIONS

"Compact Keyboard", IBM Tech. Disch. Bulletin (Beausoleil et al.), vol. 13, No. 11, Apr. 1971.

*Primary Examiner*—Thomas Mullen

[57] ABSTRACT

In a key pad key cap symbols are placed at the interstices between key caps as well as at their centers. The key pad electronics are designed to register simultaneously actuated key caps at an interstice as an input uniquely associated with the symbol locate at the interstice. The linear dimension of a row of key caps are approximately one-half that of a conventional key cap requiring approximately two key caps to form a linear dimension sizable enough to comfortably accommodate the tip of an adult finger. Additionally, the symbols located at the centers of key caps are elevated slightly, allowing unimpeded and ergonomic access to individual keys as well as the interstices.

9 Claims, 3 Drawing Sheets

COMPACT KEYPAD SYSTEM AND METHOD

FIELD OF THE INVENTION

This invention is in the field of keypad input for small electronic devices, particularly for communications and combination locks.

BACKGROUND OF THE INVENTION

Electronic devices continue to become smaller and more complex. As the complexity increases, there is a tendency for these devices to require more buttons, including entire alphanumeric character sets and as well as additional function-specific keys. Combination keypad locks are more difficult to pick when an increased number combinations are possible. Specific examples include: remote control units for complex tasks such as interactive television; cellular telephones and pagers with written communication capabilities; combination keypad lock interfaces; and wired telephones with peripheral control abilities.

Such devices are problematic because the human hand remains relatively constant in size while the componentry shrinks. The result is that the interface to the hand, the keypad, often dictates the smallest possible size of an electronic device. It is therefore increasingly important to minimize the size of the keypad without reducing the size of the keys smaller than the human hand may use comfortably.

Previous efforts to address this issue consist of the following:

Scale the Keypad Smaller

The most obvious way to increase the number of functions in a given area is to scale the keypad smaller reducing key cap size and decreasing the distance between key cap centers. This technique causes the user to feel constrained. Products which use small keypads suffer from the impression that they are toy-like, largely because, in fact, they are scaled for use by a child. Decreasing key cap size makes the keys less comfortable to a full-sized adult finger. Decreasing the distance between key cap centers increases the likelihood of accidental input. Decreasing the size of the legend reduces legibility and the ease of viewing. In these ways, this solution is workable but far from optimal.

Chorded keyboards

Chorded keyboards have a relatively small number of keys, often linearly disposed to conform with the resting position of the human hand, which operate in combination to form each input, offering 2 raised to the N number of different inputs where N is the number of keys. The primary problem with this solution is that it requires the user to memorize 2^N input combinations and to develop the necessary motor skills. While this is a workable solution for extremely dedicated users, it is impractical and requires an unrealistically large amount of practice for most.

Modal Solutions

There are a variety of solutions in which individual keys are given a plurality of functions: Time variance modality varies the time between key operations to define the output function. This is non-intuitive and severely restricts the pace at which an operator may work; Function key modality alters the functionality of the keystroke(s) which follow in a predetermined manner. While this is an extremely common technique, it has limitations. While a function key doubles the possible outputs of a keypad, it also doubles the number of keystrokes required. Further, it is impractical to reduce the dimension of the standard 10-key keypad or the space required by the 26 letters of the alphabet by implementing a function key solution because the characters of these sets are of near-equal significance. Force sensitive modality incorporates a plurality of force-levels to a single button, and thereby a plurality of functions. Tests show that there is a wide variation in the forces naturally applied by users and wide variations in the levels of force sensitivity between users. The solution is highly non-intuitive. For these reasons, force sensitive keys are not widely applicable, nor desirable.

What is desirable is a keypad which increases the number of functions which can be output from a given number of keys, without compromising the ergonomic advantages of full-size and individually operable key caps. It is further desirable to not require any learning or practice. The keypad would be non-modal to eliminate the confusion and errors commonly associated with modalities. Each output function would permanently correlate with a single key cap location. The identifying legends would be full-size for easy identification. Functions would be accessible by a single finger push. The keypad would be small without being toy-like because it is designed to accommodate a full-size human finger. Ideally a compact keypad would effect full-sized key caps with on center distances smaller than full-sized key cap dimensions allow.

SUMMARY OF THE INVENTION

In this invention the above limitations are overcome and objects and advantages achieved by placing the key cap legends at the interstices of (rather than at the centers of) the key caps. The electronics are designed to register the simultaneous actuation of the plurality of key caps associated with each interstice. Further, in a preferred embodiment, the size of each key is reduced to approximately half that of a standard full-sized key cap. Therefore, as a finger presses an interstice, it presses on an area approximately equal to a standard key cap, but is actuating a plurality of key switches rather than only one. In this manner 2N–1 separate inputs may be ergonomically accommodated in the linear width which would otherwise accommodate only N inputs.

The international (ISO) standard for the smallest dimension between key switches (herein called the key switch dimension) was established at 18 mm because this is considered to be the smallest dimension which allows the human finger easy access to a specific key without the risk of accidentally actuating an adjacent key. The present invention overcomes this limitation by using each area of the keypad redundantly, thereby increasing the number of functions which may be comfortably and reliably accessed in a given area. The advantages provided by the invention are independent of the key switch technology used to implement it.

A further increased number of inputs are made available by additionally using each key individually. There is an apparent contradiction in reducing the size of said key caps and the stated goal of offering ease of use to the user. However, in the preferred embodiment a contoured key cap elevates the centers of each individual key cap, thereby allowing comfortable and ergonomic access to each individual key as well as to the interstices which comprise the aforementioned inputs. In embodiments with displaceable key switches, the height of the contour is approximately equal to the distance of key switch displacement. The gaps between the gentle contours offer comfortable and ergonomic access to the inputs located at the interstices because of the increased contact area afforded by the Pythagorean distance between key cap centers and the subtlety of the contour.

The improved functionality is substantial. For example, the preferred embodiment allows 52 additional independently actuatable functions (61 total) into the area normally occupied by nine standard keys. This is accomplished without decreasing the level of ergonomic comfort to access any of the functions. Conversely, the invention may be used to decrease the size of an existing keypad while retaining the existing functionality, ergonomics and ease of use.

The surface which comes into contact with the finger is here called the contact surface. In the present invention the contact surface may be implemented with a continuous elastomeric or plastic material and the key switches are not required to physically displace during actuation. However, there is a wide range of capacitive and force sensitive pad technologies which use analog measuring techniques to establish the position of the finger. These technologies are inapplicable to the present invention which requires at least two discrete and independently operable key switches to be used for a single functional input. The use of discrete switches allows the full integration of the position and actuation functional aspects that are inherent to the operation of a keypad, whereas these functional aspects are independently achieved in analog position sense technologies, thereby adding to their complexity and cost.

The contact surface of the present invention, if comprised of discrete key caps, are designed differently than standard discrete key caps. Standard key caps have a skirt, or taper to provide visual and tactile differentiation between key caps. This also serves to prevent accidental inputs from occurring. The present invention is the opposite in design. The distance between key cap top surfaces is minimized with the goal of reducing the visual and tactile void between adjacent key caps.

The electronics of the present invention are able to sense the simultaneous actuation of adjacent key switches. However, not all key switches associated with an interstice must be actuated to uniquely identify an interstice. Therefore, the electronics are designed to interpret the user's intended input based upon the minimum number of key switch actuations to uniquely identify the interstice. A brief timing delay (on the order of 0.2 seconds) may be incorporated to eliminate non-intended actuations. The implementation of these techniques are known to those in the art.

It is therefore a goal of the present invention to provide an compact keypad in which each function may be actuated comfortably by an adult-sized human finger.

It is an additional goal of this invention to provide an increased number of functions within a given area without compromising the ergonomic advantages of full-size key caps.

It is an additional goal of this invention to provide a compact keypad in which each function may be accessed by a single finger motion.

It is a further goal to provide an increased number of inputs without requiring memorization, training to use, or the introduction of a modality.

It is yet a further goal of this invention to provide a means to derive the above benefits without the need to restrict the discrete key switch technology used for its implementation, except for specifically not using analog or continuous technologies which would have a detrimental impact on cost.

REFERENCE NUMERALS IN DRAWINGS

Figure 1:
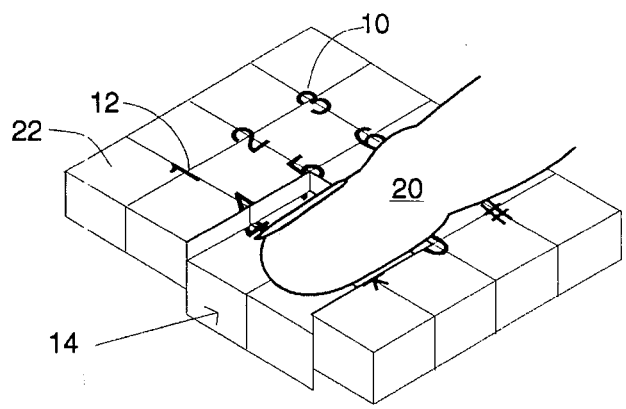
FIG. 1 shows a perspective view of a finger actuating the function "number 7" in a telephone keypad embodiment of the present invention.

7a–7d Key caps associated with the number "7"
10 Interstice legend
12 Interstice
14 Associated key caps
20 Finger
22 Key cap
24 Standard individual key cap
27 Key switch mechanism
28 Side
29 Central axis
30 Top surface
32 Contact element
34 Input element
35 Spring element
36 Inner surface
38 Housing
40 Radius
45 Center legend
50 Dome
52 Finger curve
60 Alphanumeric character set
62 Calculator keys
70 Triagonal key caps

DETAILED DESCRIPTION

Figure 3:
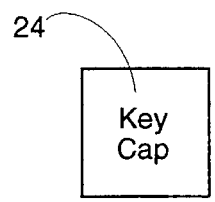
FIG. 3 shows a standard key cap as a dimensional reference.

FIG. 1 shows the present invention embodied as a compact telephone keypad during actuation by a finger 20. Each interstice legend 10 is placed at the interstice 12 formed by the intersection of associated key caps 14. The term "associated key caps" 14 will be used throughout this document to refer to the set of individual key caps 22 which are designed to operate in unison and thereby inform the control electronics that the user intends the function identified by the interstice legend 10 located at the intersection of the associated key caps 14. In this embodiment each interstice legend 10 has four associated key caps 14 and each individual key cap 22 is sized such that each group of four associated key caps 14 are approximately comparable in size to a standard individual key cap 24, as shown in FIG. 3. The finger 20 is shown pressing the associated key caps 14 which actuate the number "7". The figure is not to scale.

Figure 2:
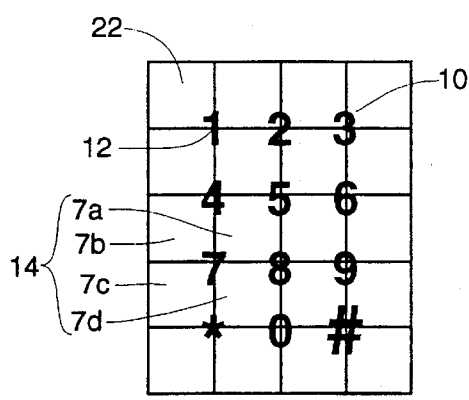
FIG. 2 shows a plan view of the drawing of FIG. 1 with the finger removed.

FIG. 2 shows a plan view of the keypad shown in FIG. 1 with the finger 20 removed for clarification. The four key caps 22 associated with the legend 10 "7" are labeled 7a, 7b, 7c, and 7d.

This embodiment of the invention allows approximately 2n−1 legends, and hence 2n−1 functions, to fit into the linear distance which normally allows only N legends (and N functions) using key caps the size of standard individual key caps 24. FIG. 2 is submitted as a full-scale drawing, allowing the reader to more easily imagine using the invention.

FIG. 3 shows a standard individual key cap 24 as reference. This figure may be used to establish a real world scale for the other figures independent of the scale to which these drawings may be reproduced.

Figure 4:
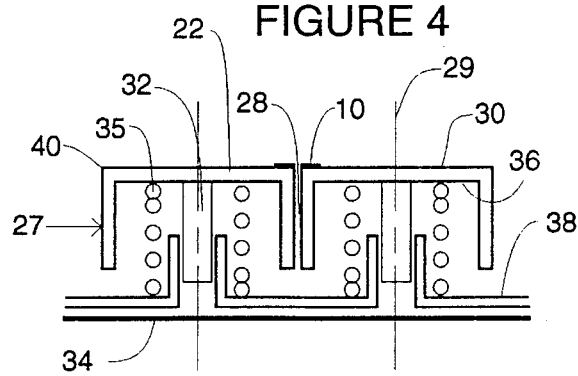
FIG. 4 shows a side view of generic key cap and key switch as a reference.

FIG. 4 shows two generic displacement actuated discrete key switches as a reference. The figure is not to scale. There are three primary differences between the design parameters of key switches for standard descrete key caps and those of the key switches for this invention. In the preferred embodiment, the key caps of the invention are significantly smaller than conventional key caps. The reduced dimension of the top surface places less torque on the key switch mechanism 27 which may therefore be of lower tolerance and/or rigidity without resulting in the key caps binding due to torque applied off the central axis 29. The side 28 of each key cap 22 abuts the side 28 of the adjacent key cap 22 and the peripheral edge defined by the radius 40 is closer to the adjacent key cap 22 and its radius 40 than adjacent key caps of the standard individual key cap 24 design. The distance between the radii 40 of adjacent top surfaces 30 are approximately 1 mm. A contact element 32 contacts the input element 34 when the key cap 22 is pressed. A spring element 35 exerts force upon the inner surface 36 and the housing 38 and raises the key cap 22 when it is not in use. The force created by the spring element 35 is chosen according to the number of key caps 22 which comprise the associated key caps 14 in the chosen embodiment. (Embodiments with fewer and greater number of associated key caps 14 are discussed below.) The top surface 30 is relatively flat and onto it is disposed the interstice legend 10. The dimension between the the central axes 29 is known as the key switch dimension 33.

Figure 5:
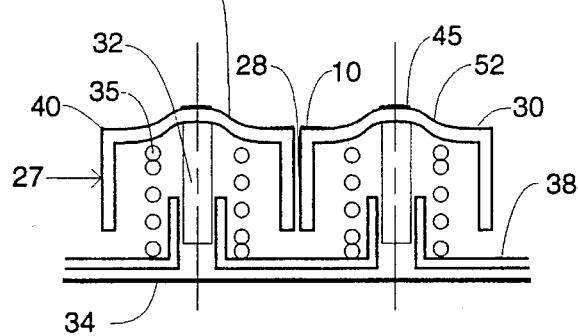
FIG. 5 shows a side view of the preferred embodiment.

FIG. 5 shows the preferred embodiment, implemented with the same key switch mechanism as shown in FIG. 4. A center legend 45 is aligned with the central axis 29 and elevated above the top surface 30 by a gently contoured dome 50. Other contours may be used. The center legend 45 is elevated by approximately the same distance as the stroke of the key switch mechanism 27. An interstice legend 10 is disposed onto the top surface 30. The graphic comprising each center legend 45 is disposed, approximately equally on all four of the associated key caps 14.

Figure 6:
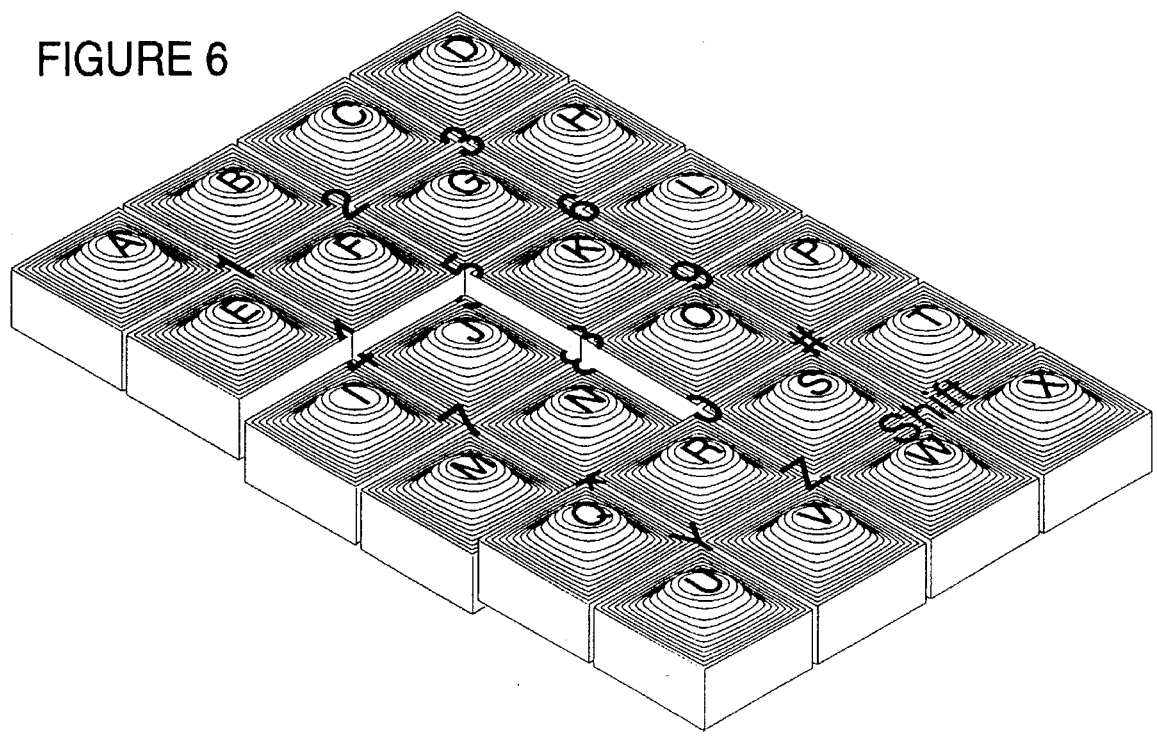
FIG. 6 shows a perspective view of the preferred embodiment.

FIG. 6 shows an perspective view of the preferred embodiment with the number "7" actuated. The drawing is larger than life size.

Figure 7A:
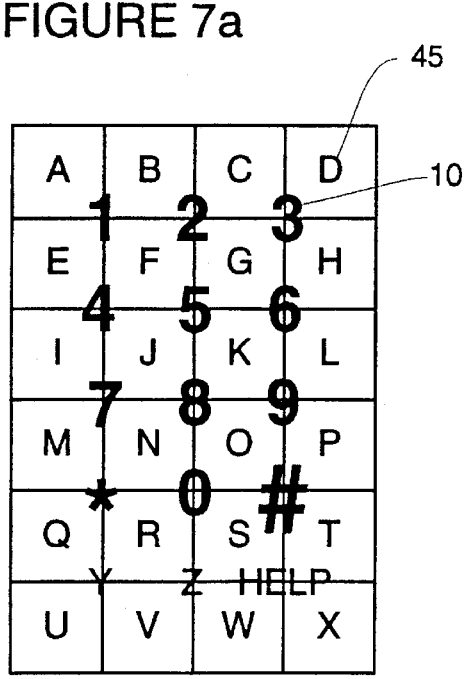
FIGS. 7a and 7b show plan views of two potential layouts of alphanumeric character sets using the preferred embodiment.

FIG. 7a shows a plan view of the drawing of FIG. 6: a standard numeric keypad implemented on the interstice legends 10 and the alphabet on the center legends 45. The drawing is to scale, allowing the reader to more easily imagine using this keypad.

Figure 7B:
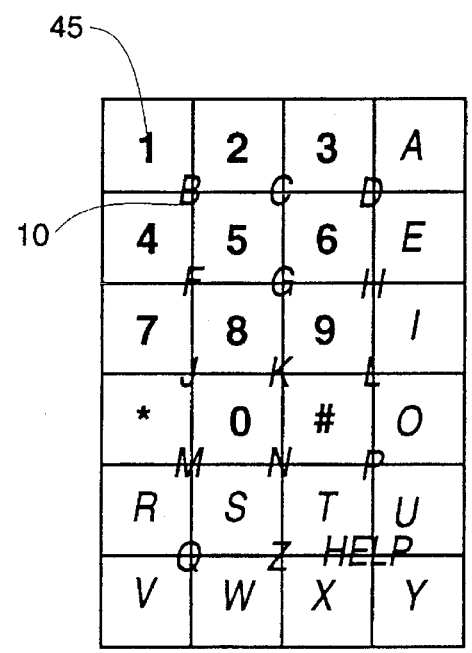

FIG. 7b shows an embodiment with a standard numeric keypad implemented on the center legends 45 and the alphabet on the interstice legends 10. The drawing is to scale, allowing the reader to imagine using this keypad.

Figure 8:
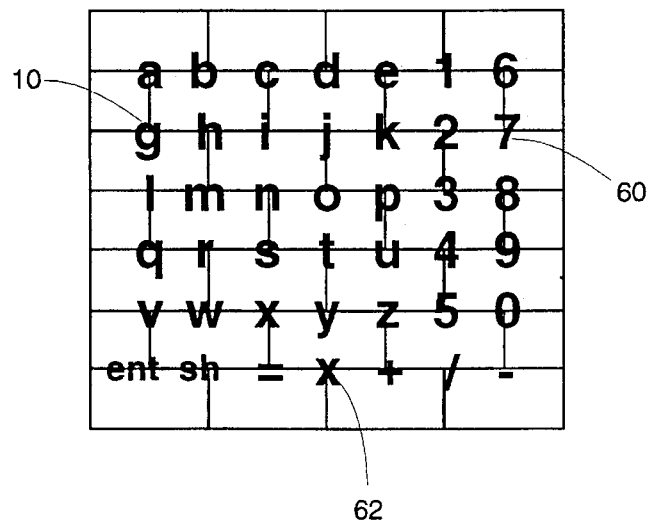
FIG. 8 shows an embodiment of an alphanumeric character set and calculator keys in a brick patterned compact keypad.

FIG. 8 shows an embodiment of an alphanumeric character set 60 and calculator keys 62 in a brick patterned compact keypad. The drawing is to scale.

Figure 9:
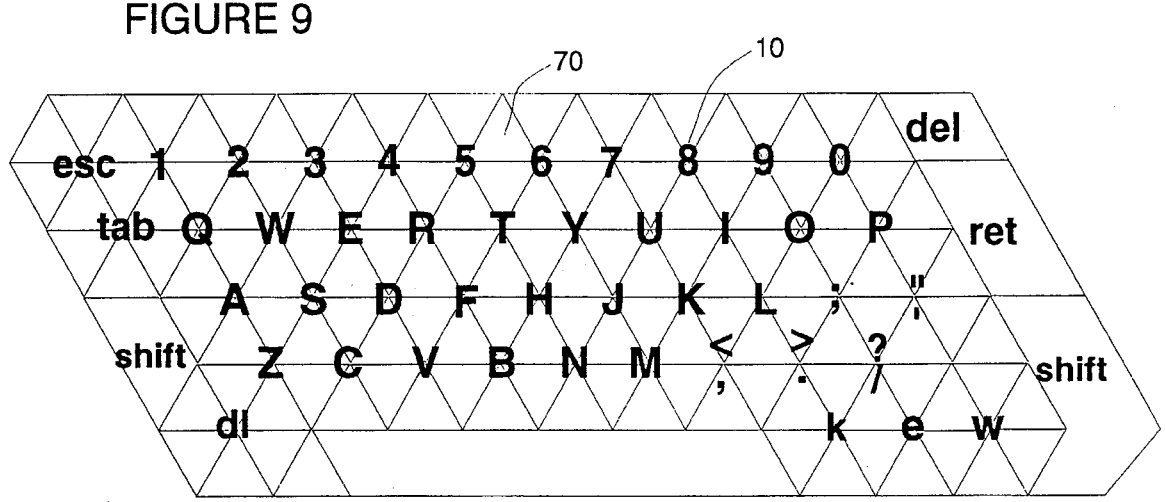
FIG. 9 shows an embodiment with an alphanumeric character set with triangular key cap sub-units.

FIG. 9 shows an embodiment of an alphanumeric keypad using triagonal key caps 70 forming hexagons with interstice legends 10. The primary advantage to this configuration is to offset each key in a manner similar to a standard typist's keyboard. This offers full-sized keys in a well-known familiar configuration in approximately one-third the area. The drawing is to scale.

While particular embodiments of the particular invention have been shown and described, it will be obvious to those skilled in the art that changes and modifications may be made without departing from this invention in its broader aspects and therefore, the appended claims are to encompass within their scope all such changes and modifications as fall within the true spirit and scope of this invention. Accordingly, the scope of the invention should not be limited to the embodiment illustrated, but by the appended claims and their legal equivalents.

I claim:

1. A compact keypad system comprising:

a housing;

a plurality of key switch means disposed on said housing;

a contact surface coupled to said plurality of key switch means;

a plurality of first symbols disposed upon said contact surface, wherein each of said first symbols (i) graphically identifies an associated location on said contact surface, (ii) corresponds with an associated one of a plurality of unique output functions, and (iii) is approximately equidistant to the key switch means of an associated one of a plurality of subsets, each subset comprising at least two adjacent ones of said plurality of key switch means wherein at least one of the dimensions between adjacent ones of said plurality of key switch means is less than the width of the adult human finger; and an electronic detection circuit sensing the simultaneous actuation of said plurality of key switch means in a subset and subsequently outputting a first signal corresponding to said unique output function associated with said subset and its associated first symbol.

2. The invention of claim 1 wherein said contact surface includes a plurality of key cap means with a contoured surface such that a center portion of each key cap means is approximately 2–3 mm higher than an outer portion of that key cap means wherein each of the key cap means has disposed on said center portion an associated one of a plurality of second symbols, thereby identifying an output function uniquely associated with each one of said key cap means.

3. A method for miniaturizing the keys of a keypad such that the contact area of each key is smaller than the associated contact area of the adult human finger without compromising ergonomic efficiency comprising the steps of:

a) designing a top surface with a set of key caps to allocate a plurality of areas on said top surface for the placement of a corresponding plurality of graphic legends thereon such that each of the legends is readily associated with an associated one of a plurality of subsets of said key caps, wherein each subset comprises two or more key caps, wherein at least one of the dimensions of each of said key caps, as measured along said top surface, is less than the width of the adult human finger;

b) disposing upon each of said areas an associated one of said plurality of graphic legends, each of which designating an associated one of a plurality of unique functions associated with said subsets;

c) coupling key switch means beneath each of said key caps; and d) generating a plurality of signals, each of said plurality of signals to be generated in response to the simultaneous pressing of the key caps of an associated one of said plurality of subsets of said key caps and the resulting actuation of at least an associated subgroup of key switch means, said subgroup consisting of any set of key switch means within a subset which uniquely identifies the associated subset from the remaining plurality of subsets.

4. The invention of claim 3 further comprising the steps of:

e) elevating a center portion of each key cap by approximately 2 to 3 millimeters; and f) printing a central graphic legend on said center portion of each of said key caps, said central graphic legend indicating an operation associated with said key switch located directly beneath said central graphic legend.

5. A compact keypad system including:

a first plurality of contact surface areas, each one of said first plurality having an associated one of a plurality of legends, adjacent ones of said first plurality located at an approximate unit distance X from each other, said first plurality disposed proximate to a first reference plane;

a second plurality of contact surface areas, each one of said second plurality having an associated one of said plurality of legends, each one of said second plurality located at said approximate unit distance X from adjacent ones of said second plurality, said second plurality disposed proximate to a second reference plane, said second reference plane approximately parallel with said first reference plane, wherein each one of said second plurality is disposed between ones of said first plurality such that each one of said second plurality is approximately equidistant to adjacent ones of said first plurality;

and said second reference plane is displaced from said first reference plane by approximately 2–3 mm, thereby providing comfortable and ergonomic access to each function of said compact keypad system.

6. The invention of claim 5 wherein said unit distance X is defined as approximately one-half the distance occupied by a standard dimension key cap, or approximately 10 mm, thereby providing comfortable and ergonomic access to approximately 2N–1 contact surface areas within said first plurality and approximately 2N contact surface areas within said second plurality, and hence a total of approximately 4N–1 different legends in a row of length equal to that of a row of N standard dimension contact surface areas of approximately 18 mm in width.

7. The invention of claim 6 wherein said first plurality of contact surface areas and said second plurality of contact surface areas are both disposed in a predominantly undulating surface contour that connects contact surface areas of said first plurality to contact surface areas of said second plurality.

8. A compact keypad for inputting data with a human finger, said keypad comprising:

a first key switch;

a second key switch;

a third key switch;

a fourth key switch;

a fifth key switch;

a sixth key switch, wherein said key switches are disposed in a matrix comprising two horizontal rows and three vertical rows, wherein the set of first, second, and third key switches are above and adjacent to the set of fourth, fifth, and sixth key switches and the set of first and fourth key switches are to the left of and adjacent to the set of second and fifth key switches and the third and sixth key switches are to the right of and adjacent to the set of second and fifth key switches, and wherein at least one of the dimensions between adjacent ones of said plurality of key switch means is less than the width of the adult human finger;

a first associated set consisting of the first, second, fourth, and fifth key switches;

a second associated set consisting of the second, third, fifth, and sixth key switches;

a first electrical signal corresponding to the actuation of any of a plurality of subsets of key switches of said first associated set which uniquely identify said first associated set;

a second electrical signal corresponding to the actuation of any of a plurality of subsets of key switches of said second associated set which uniquely identify said second associated set;

electronics to generate the first and second signals;

a plurality of key cap means wherein each of said key cap means is disposed above an associated one of said key switches;

a first legend, said first legend disposed on said key cap means approximately equidistant from said first, second, fourth and fifth switches; and a second legend, said second legend disposed on said key cap means approximately equidistant from the second, third, fifth and sixth key switches.

9. The invention of claim 8 wherein each of said key cap means has a contoured shape such that a center portion is approximately 2–3 mm higher than an outer portion; and further including a central legend means located on said center portion of each of said key caps.

* * * * *